United States Patent [19]
Pepe

[11] Patent Number: 5,600,477
[45] Date of Patent: Feb. 4, 1997

[54] BEAM SCANNER

[75] Inventor: Robert D. Pepe, Dracut, Mass.

[73] Assignee: Bayer Corporation, Wilmington, Mass.

[21] Appl. No.: 434,963

[22] Filed: May 4, 1995

[51] Int. Cl.⁶ .................................................. G02B 26/08
[52] U.S. Cl. .......................... 359/220; 359/196; 359/198; 359/212
[58] Field of Search .................................... 359/196, 198, 359/212, 220, 819, 820, 830, 872, 877; 235/467; 250/230

[56] References Cited

U.S. PATENT DOCUMENTS

| | | |
|---|---|---|
| 4,131,916 | 12/1978 | Landsman . |
| 4,723,833 | 2/1988 | Yamada ..................................... 359/820 |
| 4,796,963 | 1/1989 | Yoshimura . |
| 5,052,782 | 10/1991 | Myer ......................................... 359/827 |
| 5,420,714 | 5/1995 | Zelenka ..................................... 359/211 |

FOREIGN PATENT DOCUMENTS

0456110A2  11/1991  European Pat. Off. .
0683415A1  11/1995  European Pat. Off. .

Primary Examiner—Paul M. Dzierzynski
Assistant Examiner—Darren E. Schuberg
Attorney, Agent, or Firm—Richard J. Birch

[57] ABSTRACT

A beam scanner has a beam deflector mounted within a hollow shield having a beam entrance aperture and a beam exit aperture. The beam exit aperture is sealed by a window through which the deflected beam exits the hollow shield. A spin motor rotates the hollow shield, beam deflector and the window about a spin axis. A hydraulic system maintains the periphery of the window in an undistorted condition.

21 Claims, 5 Drawing Sheets

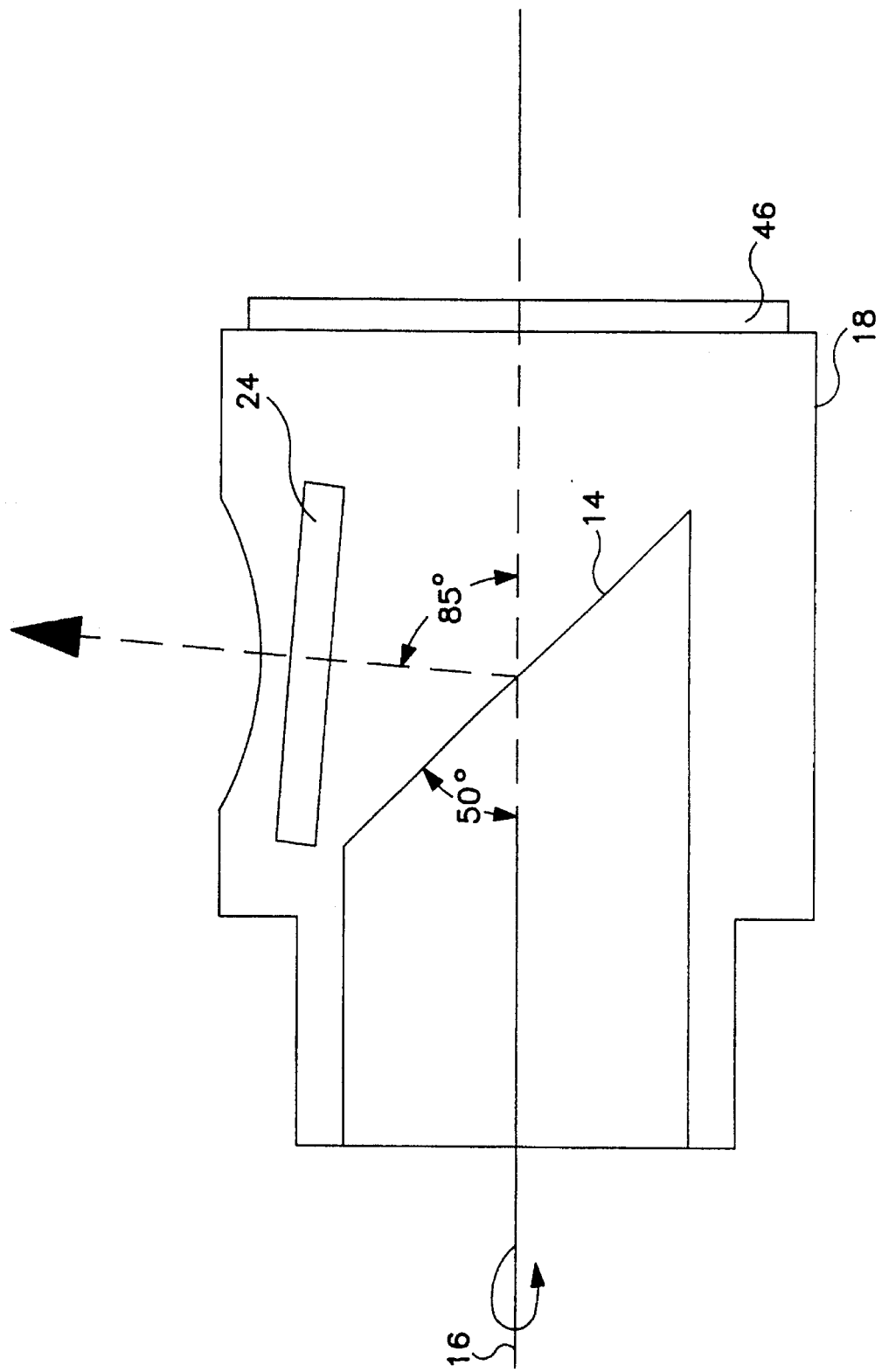

BEAM SCANNER

BACKGROUND OF THE INVENTION

The present invention relates to beam scanners in general, and, more particularly, to a high speed beam scanner for use in drum-type laser imagesetters.

High resolution drum-type laser imagesetters require low wobble, low noise and first surface spin mirror with minimal optical aberrations. As the electronic imaging market demands faster and faster scan speeds, a variety of problems arise with increased scan speed. First, the inherent nature of the spinners' 45 degree surface increases windage and noise when the speed is increased. Windage is considered to be a forcing function for air-bearing wobble, and the audible noise becomes a work environment concern at high rotational speeds. Additionally, any increase of the pumping of ambient air across the spin mirror surface increases both erosion and chemical degradation. This is especially true for highly polluted areas.

It is a general object of the present invention to provide an improved high speed beam scanner.

It is a specific object of the invention to reduce acoustic noise associated with a high speed rotating beam deflector.

It is another object of the invention to reduce windage in the high speed rotation beam deflector.

It is still another object of the invention to prevent deleterious effects upon the rotating beam deflector caused by environmental conditions external to the rotating beam deflector.

It is a further object of the invention to enclose the rotating deflector in a hollow shield having beam entrance and exit apertures.

It is a still further object of the invention to environmentally seal the exit aperture with a flat window.

It is yet another object of the invention to prevent edge distortion of the flat window during rotation of the hollow shield.

SUMMARY OF THE INVENTION

The invention comprises a beam scanner that has a beam deflector mounted within a hollow shield having beam entrance and exit apertures. The beam exit aperture is sealed by a window through which the deflected beam exits the hollow shield. The beam deflector and hollow shield are rotated together about a spin axis by a spin motor. A hydraulic system maintains the periphery of the window in an undistorted condition.

DETAILED DESCRIPTION OF THE INVENTION

Figure 1:
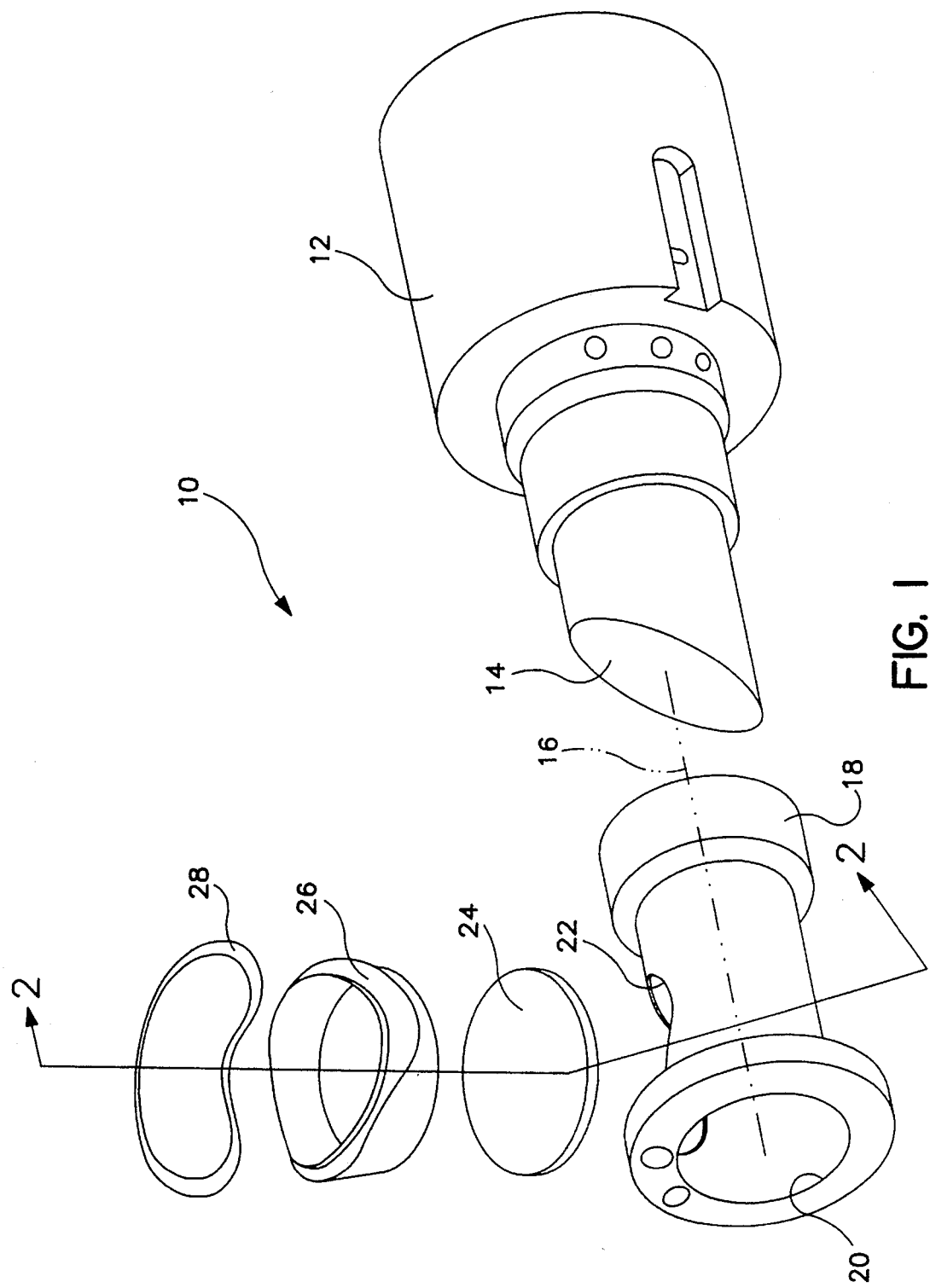
FIG. 1 is an exploded view in perspective of a beam scanner having a beam deflector, a hollow shield with entrance and exit apertures, a window sealing the exit aperture and a spin motor.

Turning now to the drawings, and particularly to FIG. 1 thereof, there is shown a beam scanner constructed in accordance with the present invention and indicated generally by the reference numeral 10. The beam scanner 10 comprises a spin motor 12 that rotates a beam deflector, such as a mirror, 14 about a spin axis 16. The beam deflector 14 is enclosed within a hollow shield 18 that also is rotated by spin motor 12.

The hollow shield 18 has a beam entrance aperture 20 and a beam exit aperture 22. The exit aperture 22 is environmentally sealed by means of a window 24 that is secured to window mount 26 which in turn is secured to the inside of the hollow shield 18. A hollow hydraulic liquid filled container or "O-ring" 28 is positioned between a portion of the window mount 26 and the inner surface 30 of the hollow shield 18.

Figure 2:
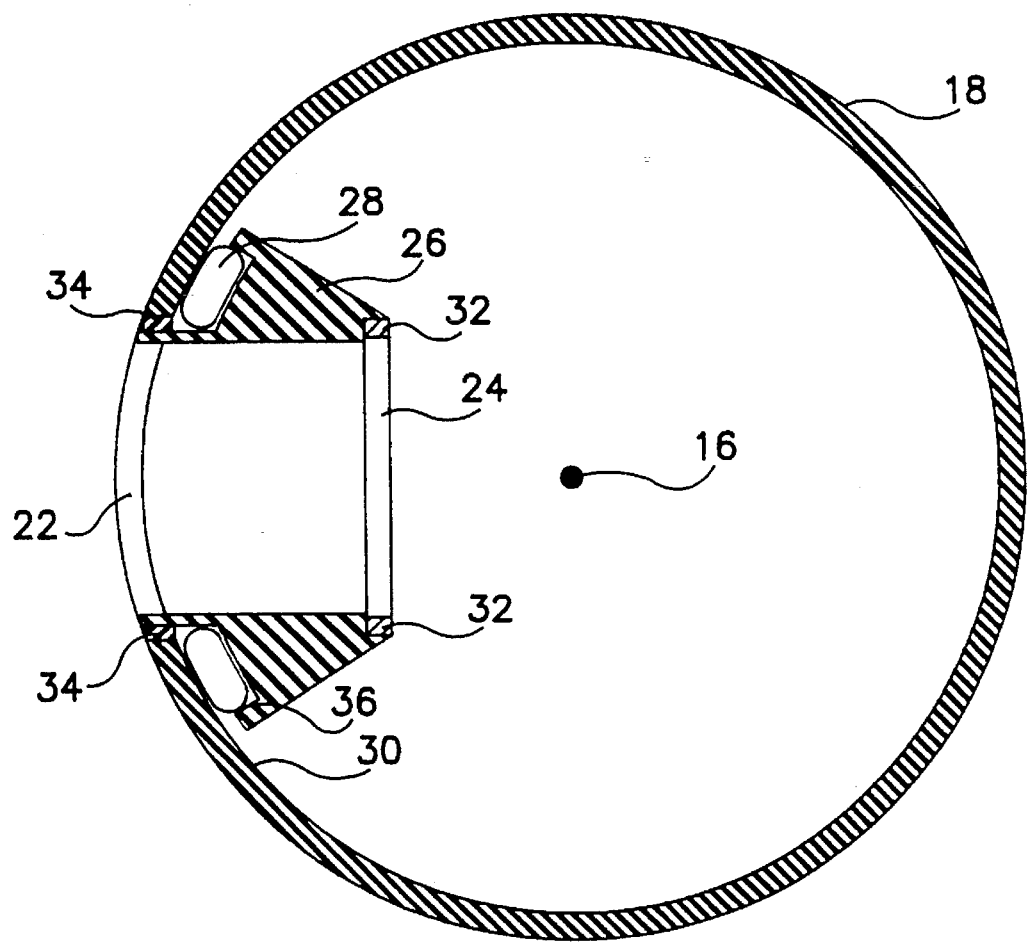
FIG. 2 is a view in cross-section taken along line 2—2 in FIG. 1 showing the static or non-rotating condition of the sectional portion of the scanner.
Figure 3:
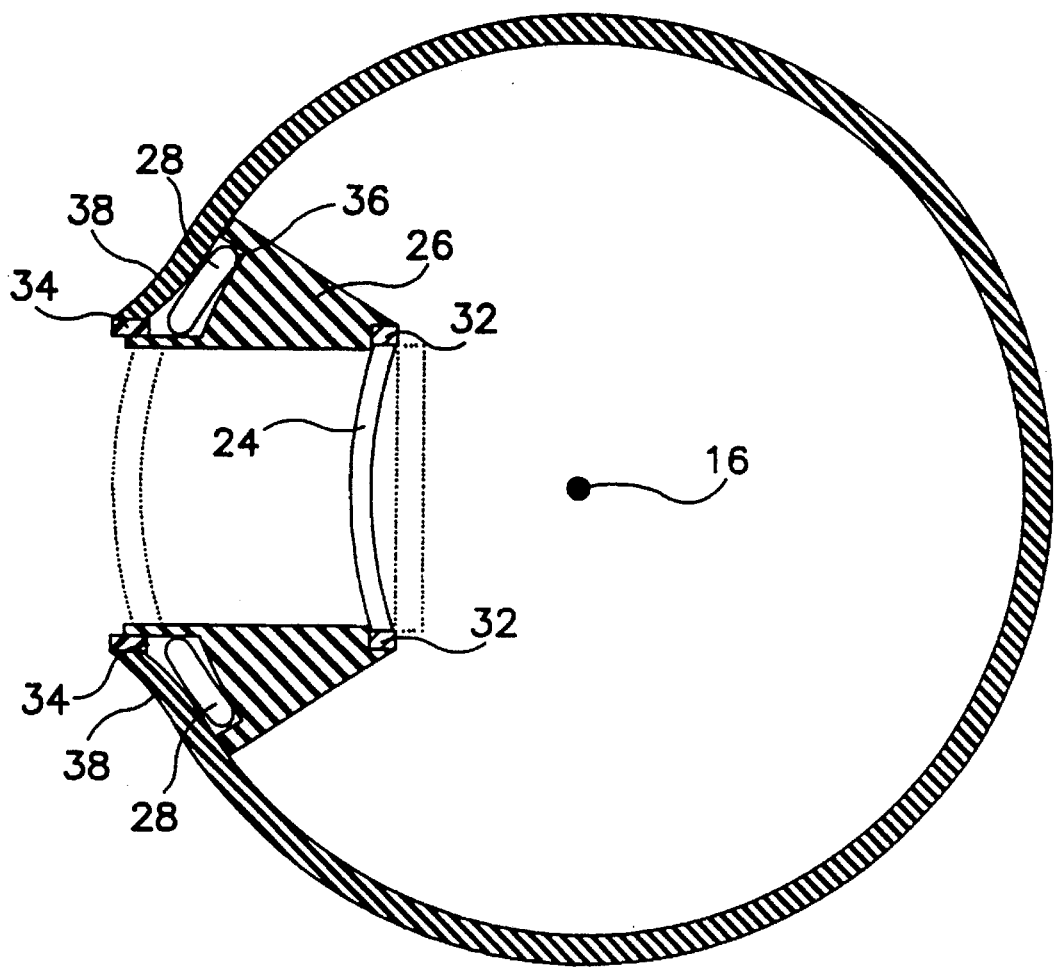
FIG. 3 is same view as FIG. 2, but showing the dynamic or rotating condition of the sectional portion of the scanner with component displacements exaggerated for purposes of illustration.

Referring now to FIGS. 2 and 3, FIG. 2 illustrates the static or non-rotating condition of the beam scanner 10. The exit aperture window 24 is secured to its window mount 26 by an optical adhesive 32. The window mount 26 is compliantly secured to the hollow shield 18 by an elastomer 34 such as RTV. The hydraulic liquid filled container or "O-ring" 28 is positioned in an annular groove 36 formed in window mount 26.

Referring now to FIG. 3, this figure illustrates, in exaggerated form, the dynamic or rotating condition of the beam scanner. It can be seen from FIG. 3 that the rotational forces have peeled away the peripheral edge 38 of the exit beam aperture 22. This "fish mouthing" of the exit beam aperture allows a shifting of the exit beam aperture window 24 from the static condition shown in dotted form to the dynamic or rotating condition shown in solid lines. In the static condition of FIG. 2 and the dotted condition of the window shown in FIG. 3, the flat window has no optical power. Under the rotating condition shown in FIG. 3, the window "bulges" and has an optical power, but this power can be compensated for by focus adjustment in the scanning system (not shown).

Figure 4:
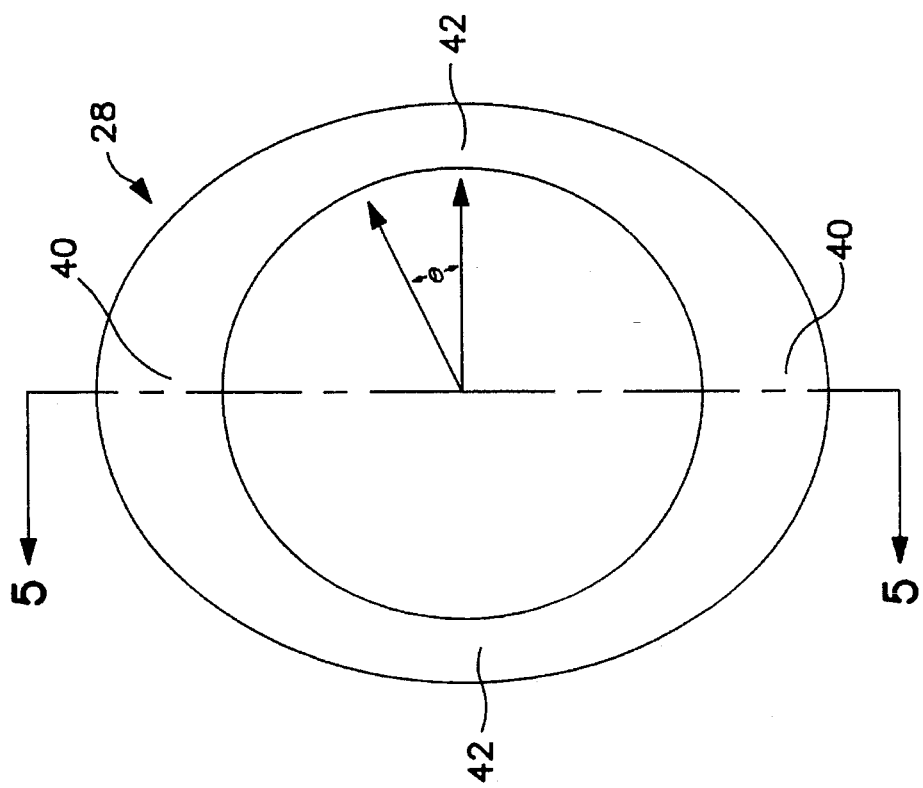
FIG. 4 is a plan view of a hollow hydraulic liquid filled container.

It will be appreciated that in order to avoid the introduction of optical aberrations of astigmatism, tricorn and coma, all points on the periphery of window 24 must be uniformly displaced. However, non-uniform forces are generated upon rotation of the hollow shield and window. The distribution of forces around the periphery are matched to provide equal displacement of all points on the periphery of window 24. This matching of the force distribution is achieved by varying the area of the hydraulic liquid filled container 28 as a function of its radial distance from rotation axis 16 such that the further the distance from rotation axis 16 the greater the area of the hydraulic liquid filled container 28. The shape of the liquid filled container 28 thereby varies according to the angle theta shown in FIG. 4. Thus, as depicted in FIG. 4, the top and bottom portions 40 have a greater area than the left and right portions 42 of the hydraulic liquid filled container 28.

Figure 5:
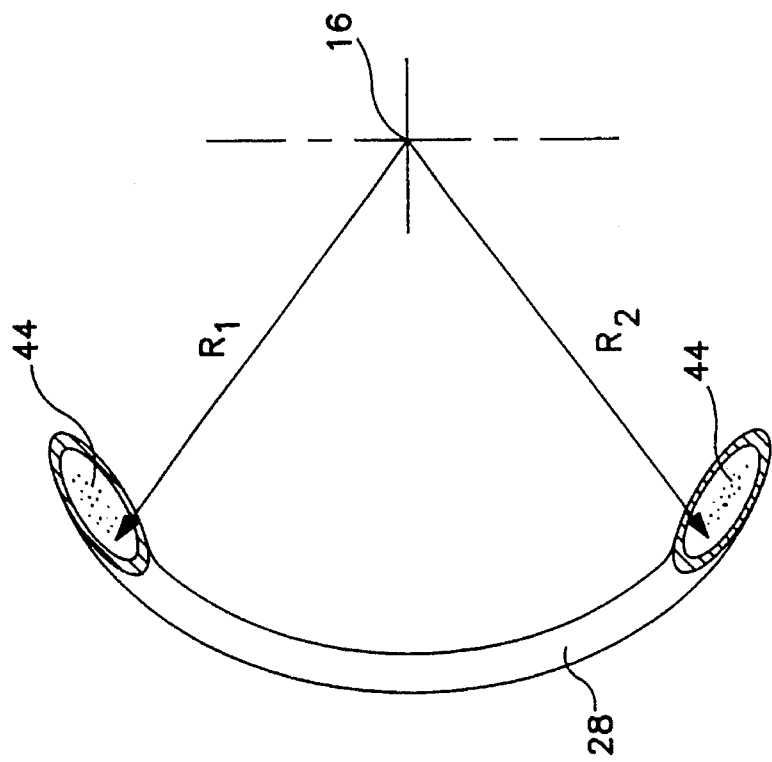
FIG. 5 is a view in cross-section taken along line 5—5 in FIG. 4 showing the curvature of the hollow hydraulic liquid filled container with respect to the spin axis of the beam scanner; and, FIG. 6 is a diagrammatic view of the beam deflector and window with the window tilted with respect to the spin axis of the beam scanner.

Referring to FIG. 5, the container or "O-ring" 28 contains a hydraulic liquid 44 such as a hydraulic oil. The container 28 is curved to conform to the curvature of the inner surface of hollow shield 18 so that radius R1 equals radius R2.

Looking at FIG. 6, the exit aperture 24 is tilted with respect to the spin axis 16. The tilting of the beam deflector 14 from the 45 degree position prevents back reflections from the beam scanner. In this configuration, the window is tilted 5 degrees a shown in FIG. 6.

It will be appreciated from the preceding discussion of the beam scanner that the window 24 provides an environmental seal with respect to the environment external to the rotating hollow shield. Preferably, the entrance aperture 20 is also sealed with a window 46 illustrated diagrammatically in FIG. 6.

Numerous variations can be made in the components described above while still achieving the objectives of the present invention. For example, althoug the hollow shield has been shown as a hollow cylinder, a spherical shield with corresponding entrance and exit apertures can be employed. Furthermore, the geometric shape of the exit aperture can be circular or non-circular with the window having a corresponding configuration. Although the window 24 has been depicted as a planar window, and is preferable because of its relative inexpensive cost, non-planar windows can be employed with a corresponding adjustment of the configuration of the hydraulic liquid filled container 28 including a uniform area in contrast to the varying area depicted in FIG. 5.

Having described in detail a preferred embodiment of my invention, it will now be apparent to those with skill in the art that numerous modifications can be made therein without departing from the scope of the invention as defined in the following claims.

What I claim is:

1. A beam scanner comprising:
   a) a beam deflecting means;
   b) a hollow shield surrounding the beam deflecting means, said hollow shield having an entrance aperture means for allowing a beam to enter the hollow shield and project onto and be deflected by said beam deflecting means and an exit aperture means for allowing the deflected beam to exit the hollow shield;
   c) a window means for environmentally sealing said exit aperture means with said window means having a periphery;
   d) rotation means for rotating said beam deflecting means, said hollow shield and said window means together about a spin axis; and,
   e) hydraulic means for maintaining the periphery of the window means in an undistorted condition.

2. The apparatus of claim 1 wherein said window means includes a planar optical element.

3. The apparatus of claim 2 wherein said planar optical element has a circular periphery.

4. The apparatus of claim 2 wherein the plane of said planar optical element is parallel to said spin axis.

5. The apparatus of claim 2 wherein the plane of said planar optical element is non-parallel to said spin axis.

6. The apparatus of claim 1 wherein said hydraulic means has a variable area that is a function of the non-uniform forces produced by the rotation of the window means.

7. The apparatus of claim 6 wherein said hollow shield has a hollow configuration with at least one uniform radius of curvature along the spin axis.

8. The apparatus of claim 7 wherein said hollow shield has a cylindrical configuration.

9. The apparatus of claim 8 wherein said exit aperture means has a non-circular periphery and wherein hydraulic means comprises enclosing means for defining a hollow volume having a corresponding non-circular configuration, said enclosing means having a curvature with respect to the spin axis with the curvature having a radius equal to the radius of curvature of the hollow cylindrical configuration of the hollow shield along the spin axis and a hydraulic liquid filling the hollow volume of said enclosing means.

10. The apparatus of claim 8 wherein said exit aperture means has a circular periphery and wherein hydraulic means comprises enclosing means for defining a hollow volume having a corresponding circular configuration and a hydraulic liquid filling the hollow volume of said enclosing means.

11. The apparatus of claim 10 wherein said enclosing means has a curvature with respect to the spin axis with the curvature having a uniform radius.

12. The apparatus of claim 8 wherein said exit aperture means has a circular periphery and wherein hydraulic means comprises enclosing means for defining a hollow volume having a corresponding circular configuration, said enclosing means having a curvature with respect to the spin axis with the curvature having a radius equal to the radius of curvature of the hollow cylindrical configuration of the hollow shield along the spin axis and a hydraulic liquid filling the hollow volume of said enclosing means.

13. The apparatus of claim 7 wherein said hollow shield has a spherical configuration.

14. The apparatus of claim 6 wherein said exit aperture means has a non-circular periphery and wherein hydraulic means comprises enclosing means for defining a hollow volume having a corresponding non-circular configuration and a hydraulic liquid filling the hollow volume of said enclosing means.

15. The apparatus of claim 14 wherein said enclosing means has a curvature with respect to the spin axis with the curvature having a uniform radius.

16. The apparatus of claim 1 wherein said entrance aperture means has a circular periphery.

17. The apparatus of claim 1 wherein said beam deflecting means includes a mirror.

18. The apparatus of claim 17 wherein said mirror is a plane mirror.

19. The apparatus of claim 18 wherein the plane mirror intersects the spin axis at 45 degrees.

20. The apparatus of claim 18 wherein the plane mirror intersects the spin axis at an angle greater than 45 degrees.

21. A beam scanner comprising:
   a beam deflecting mirror;
   a cylindrical hollow shield surrounding the beam deflecting mirror, said cylindrical hollow shield having a beam entrance aperture and a beam exit aperture having a periphery;
   a window, mounted on an inside surface of the cylindrical hollow shield, said window covering the exit aperture of the cylindrical hollow shield;
   a hydraulic liquid filled container positioned around the periphery of the exit aperture and held with respect to the inner surface of the cylindrical hollow shield, said hydraulic liquid filled container being mechanically coupled to said window;
   a motor having a rotatable shaft that is mechanically coupled to the beam deflecting mirror and to the cylindrical hollow shield so that the mirror and shield can be rotated together about a spin axis.

* * * * *